United States Patent [19]
Nakayama et al.

[11] 3,714,083
[45] Jan. 30, 1973

[54] METHOD FOR PRODUCING FOAMED ARTICLE FROM POLYPROPYLENE

[75] Inventors: Yujiro Nakayama; Tadayuki Fukada; Masayuki Ogawa, all of Yokkaichi-shi, Mie, Japan

[73] Assignee: Mitsubishi Petrochemical Co., Ltd., Tokyo, Japan

[22] Filed: Jan. 13, 1969

[21] Appl. No.: 790,858

[30] Foreign Application Priority Data

Jan. 12, 1968 Japan ............................43/1448

[52] U.S. Cl....260/2.5 HA, 204/159.17, 260/2.5 HB, 260/877, 260/878 R, 260/885, 260/886
[51] Int. Cl.........C08f 47/10, C08f 19/20, C08f 1/16
[58] Field of Search.....204/159.17; 260/2.5 HA, 877

[56] References Cited

UNITED STATES PATENTS

| | | | |
|---|---|---|---|
| 3,294,869 | 12/1966 | Robinson | 204/159.17 |
| 3,413,244 | 11/1968 | Landler et al. | 260/2.5 |

*Primary Examiner*—Murray Tillman
*Assistant Examiner*—Wilbert J. Briggs, Sr.
*Attorney*—Sughrue, Rothwell, Mion, Zinn & Macpeak

[57] ABSTRACT

A method of producing a foamed article having a uniform cellular structure using a modified polypropylene produced by irradiating polypropylene with an ionizing radiation of from 0.1 to 5.0 megarad and graft-copolymerizing the irradiated polypropylene with from 0.5 – 6 percent by weight divinyl benzene or with from 0.5 – 6 percent by weight of divinyl benzene and not more than 10 percent by weight of an acrylic acid ester.

8 Claims, No Drawings

METHOD FOR PRODUCING FOAMED ARTICLE FROM POLYPROPYLENE

BACKGROUND OF THE INVENTION

1. Field of the Invention

The present invention relates to a method for modifying polypropylene useful for producing foamed articles having a uniform cellular structure.

2. Description of the Prior Art

A number of studies have hitherto been made with respect to various synthetic resins having cellular structures, and uniform foams have been commercially produced from such non-crystalline resins as polyurethane, polystyrene, etc. However, it was extremely difficult to produce uniformly foamed products from crystalline resins such as polyethylene and polypropylene, owing to the abrupt drop in the viscosity of the resins at their melting points.

Recently, the problem of the abrupt viscosity drop at the melting point has almost been resolved, with respect to polyethylene, by the remarkable progress in crosslinking techniques, so that foams of polyethylene having fine and uniform cellular structures are now available. However, it is still a matter of difficulty to obtain uniform foams of polypropylene owing to the difference in its polymer structure from that of polyethylene which gives rise to the many unsolved problems on crosslinking techniques.

We, the inventors have now discovered, during the course of a series of studies on the graft-copolymerization of polypropylene induced by ionizing radiation, that a modified polypropylene having excellent foaming property based on its improved melt characteristics can now be obtained by a process comprising irradiating polypropylene with an ionizing radiation, then graft-copolymerizing the resulted polypropylene with divinyl benzene or with divinyl benzene and an acrylic acid ester.

DESCRIPTION OF THE INVENTION

More particularly, the present invention relates to a modified polypropylene used as the material for polypropylene foams characterized in the process for making the same in which polypropylene is first irradiated with an ionizing radiation of 0.1 – 5 megarad (Mrad), then it is graft-copolymerized with 0.5–6 percent by weight of divinyl benzene or 0.5–6 percent by weight of dinvinyl benzene and not more than 10 percent by weight of an acrylic acid ester.

The modified polypropylene of the present invention is thus obtained by preliminarily irradiating ordinary polypropylene with an ionizing radiation, then graft-copolymerizing with divinyl benzene or both divinyl benzene and an acrylic acid ester.

The source of the ionizing radiation to be employed for the pretreatment of polypropylene includes electronic rays, gamma rays, alpha rays, and neutron rays in a dosage of 0.1–5 Mrad, preferably 0.5–1 Mrad. Irradiation over 5 Mrad will cause excessive breakage and degradation of polypropylene even at a temperature as low at 5°C or below, and hence is not desirable. In the range below 0.1 Mrad, the desired effect of the irradiation can not be obtained. In general, the irradiation within the range of 0.5–1 Mrad is satisfactory for obtaining a modified polypropylene having excellent physical properties.

The temperature of the irradiation is usually kept as low as 5°C or below. The use of higher temperatures upon the irradiation is not desirable since the formation of homopolymers becomes predominant.

The degree of graft-copolymerization with the use of divinyl benzene is usually within the range of 0.5–6 percent by weight, preferably 1–3 percent by weight. The degree of graft-copolymerization in the range higher than about 6 percent by weight will result in poor foaming which often leads to the formation of foam cells having larger diameters, and therefore should be avoided. The degree of graft-copolymerization in the range below 0.5 percent by weight will give insufficient results.

The degree of graft-copolymerization with the acrylic acid ester to be employed, e.g., ethyl acrylate, is in the range of up to 10 percent by weight, preferably 0.5–4 percent by weight. At the degree of graft-copolymerization of about 10 percent or higher with the acrylic acid esters, the foaming character of the resulting copolymer becomes much poorer and the diameter of the cell so formed becomes so great that this percentage defines the upper limit.

The graft-copolymerization reaction according to the present invention may be carried out by preliminarily irradiating powdery polypropylene with an ionizing radiation in air at a temperature of below 5°C, preferably within the range as low as from −20° to −40°C, then subjecting the resulting polypropylene to the graft-copolymerization with the grafting monomer or monomers in the solution containing the monomer or monomers and a solvent such as methanol, at a temperature of 30° – 40°C.

According to this process, the formation of homopolymers, which is usually the most difficult problem in carrying out the graft-copolymerization, can be kept to a minimum, and now it is possible to obtain a modified polypropylene with an excellent foaming property.

In order to determine the presence of any crosslink in the modified polypropylene of the present invention, the degree of gelation was measured by extracting with a Soxhlet's extractor in boiling tetralin for 10 hours. As the result, there was observed no gel formation, and if any, the degree of cross-linking was found to be not so high as to form infinite reticular structure, i.e., gels.

In producing foamed polypropylene according to the present invention, the modified polypropylene is intermixed with a conventional foaming agent having a decomposition point higher than the melting point of the modified polypropylene of the present invention (i.e., about 160°–170°C), such as, for example, azobis carbonamide (decomposition point: 195°–200°C) and N, N'-dinitrosopentamethylene tetramine (decomposition point: 195°–200°C), using a suitable mixer such as a Nauta mixer; then the mixture is heated in a suitable molding apparatus.

The modified polypropylene of the present invention has a superior foaming property which is supposed to be derived from unique improvements in melt characteristics to an extent not only that experienced on ordinary improvement about polyethylene but also on other factors which are considered to be much more influential upon foaming properties such as, mainly melt tension etc.

The primary advantage exerted by the modified polypropylene of the present invention is such that the foaming ratio, i.e., degree of expansion, can be increased much higher without lowering any physical properties such as rigidity. Another advantage resides in that fine foams having uniform closed cellular structure can be obtained whether the foaming ratio is high or low.

In comparing with the case where the graft-copolymerization is carried out by the use of divinyl benzene alone, the copolymerization with both divinyl benzene and acrylic acid ester gives much more uniform closed cellular structure to obtain foamed products with nice hand-feeling though the rigidity becomes somewhat poorer.

The invention will be more fully explained by referring to the following examples, which are illustrative of rather than limitations of the present invention.

EXAMPLE I 1,000 g. of powdery polypropylene (Sp. Gr.: 0.91, M.I.: 3.6 i.e., isotactic, polypropylene,) was cooled to −30°C, then irradiated with electronic rays from a linear accelerator of 4MeV, 200 mA, to a dosage of 0.5 Mrad. The resulting polypropylene was put into 3,000 ml. of various solutions of divinyl benzene in methanol (the ratio of divinyl benzene to methanol were 1:30, 1:24, 1:16, 1:11 and 1:7 respectively) and the graft-copolymerization was conducted therein at 50°C for an hour. After washing the resultant reaction product with methanol, the graft-polymerization degrees of the product were determined to be 0.5, 1.0, 1.5, 2.1, 3.9 and 5.8 percent respectively.

The resultant graft-copolymer was then foamed by first admixing thereto 1–2 percent of azobis carbonamide by dry-blending and then press-foaming at 210°C for 10 minutes.

The same test as above was carried out as to an untreated sample of polypropylene for comparison. The results of the above tests are given in Table 1.

TABLE I

| Run No. | content of divinyl benzene in polymer (%) | Conc. of Foaming agent (%) | sp. gr. of Foams obtained | Diameter of Foamed cell (mm) | Appearance |
|---|---|---|---|---|---|
| 1 | 0 | 1 | 0.452 | Non-uniform | Non-uniform |
| 2 | 0.5 | 1 | 0.201 | 0.3 – 0.5 | Uniform |
| 3 | 1.0 | 1 | 0.184 | less than 0.3 | Fine |
| 4 | 1.5 | 1 | 0.140 | less than 0.3 | Fine |
| 5 | 2.1 | 1 | 0.138 | less than 0.3 | Fine |
| 6 | 3.9 | 1 | 0.184 | less than 0.3 | Fine |
| 7 | 5.8 | 1 | 0.430 | 0.5 – 1.0 | Uniform |
| 8 | 2.1 | 2 | 0.115 | less than 0.3 | Fine |

EXAMPLE 2

1,000g. of powdery polypropylene (Sp. Gr.: 0.91, M.I.: 3.6) was cooled to −30°C, then irradiated with electron rays from a linear accelerator of 4MeV, 20mA to a dosage of 0.5 Mrad. The resultant polypropylene was put into 3,000 ml. of solutions of divinyl benzene and ethyl acrylate in methanol (the ratios of divinyl benzene and ethyl acrylate to methanol were 1:30.3:10 – 1:2.7:3 respectively), and the graft-copolymerization was conducted therein at 50°C for an hour. After washing the reaction product with methanol, the degree of graft-copolymerization were measured as presented in Table 2 in Run Nos. 11–21.

The resultant graft-copolymer was incorporated with 1 or 2 percent of azobis-carbonamide by dry-blending and subjected to press-foaming at 210°C for 10 minutes. A series of similar tests on untreated polypropylene and that graft-copolymerized with ethyl acrylate alone were also carried out for the purpose of comparison. The results of the tests are given in Table 2.

TABLE 2

| Run No. | Content of Divinyl benzene in polymer (%) | Content of Acrylate in polymer (%) | Conc. of foaming agent (%) | Sp. Gr. of Foam obtained | Diameter of Foamed Cell (mm) | Appearance |
|---|---|---|---|---|---|---|
| 9 | 0 | 0 | 1 | 0.452 | non-uniform | non-uniform |
| 10 | 0 | 3 | 1 | Not foam | — | — |
| 11 | 0.8 | 0.5 | 1 | 0.213 | 0.3–0.5 | Fine |
| 12 | 1.2 | 0.5 | 1 | 0.185 | less than 0.3 | Fine |
| 13 | 1.5 | 0.6 | 1 | 0.140 | 0.3 | Fine |
| 14 | 1.6 | 1.1 | 1 | 0.141 | 0.3 | Fine |
| 15 | 1.7 | 2.0 | 1 | 0.167 | 0.3 | Fine |
| 16 | 1.8 | 2.9 | 1 | 0.185 | 0.3–0.5 | Fine |
| 17 | 2.2 | 4.1 | 1 | 0.203 | 0.3–0.5 | Uniform |
| 18 | 2.5 | 6.4 | 1 | 0.411 | 0.5–1.0 | Uniform |
| 19 | 2.4 | 9.6 | 1 | 0.450 | 1.0–2.0 | Uniform |
| 20 | 2.2 | 0.8 | 2 | 0.120 | less than 0.3 | Fine |
| 21 | 2.2 | 2.0 | 1 | 0.167 | 0.3 | Fine |

REFERENCE EXAMPLE

According to Example 1, a series of tests were carried out on various graft-copolymers obtained by using butyl acrylate, ethyl acrylate, methyl methacrylate, styrene, acrylic acid, acryloni trile, vinyl acetate, and methyl vinyl pyridine as grafting monomers. As seen from the results given in Table 3, no foaming took place with any samples.

TABLE 3

| Run No. | Graft Monomer | Grafting degree(%) | Foaming Property | State of Cell |
|---|---|---|---|---|
| 22 | Butyl acrylate | 3.7 | not foamed | No cell Structure observed |
|  |  | 5.8 | " | " |
|  |  | 8.6 | " | " |
|  |  | 14.5 | " | " |
|  |  | 21.5 | " | " |
| 2.3 | Ethyl acrylate | 3.7 | " | " |
|  |  | 6.5 | " | " |
| 2.4 | Methyl methacrylate | 11.8 | " | " |
|  |  | 4.2 | " | " |
|  |  | 7.7 | " | " |
|  |  | 13.6 | " | " |
| 2.5 | Styrene | 3.0 | " | " |
|  |  | 22.3 | " | " |
| 2.6 | Acrylic acid | 6.2 | " | " |
|  |  | 25.4 | " | " |
|  |  | 32.0 | " | " |
| 2.7 | Acrylonitrile | 2.4 | " | " |
|  |  | 5.5 | " | " |
|  |  | 23.0 | " | " |
| 2.8 | Vinyl | 5.5 | " | " |

| | | | |
|---|---|---|---|
| 2.9 | acetate | 9.7 | " " |
| | Methyl vinyl pyridine | 2.5 10.4 23.4 | " " " " " " |

What we claim is:

1. A process of producing a foamed product consisting essentially of irradiating polypropylene having a specific gravity of about 0.91 and a melt index of about 3.6 with an ionizing radiation of from 0.1 to 5.0 megarad, then graft-copolymerizing the resulting irradiated polypropylene with from 0.5 to 6% by weight divinyl benzene, forming a mixture of the resulting modified graft-co-polymerized polypropylene with a foaming agent having a decomposition point higher than the melting point of said modified graft-copolymerized polypropylene and then heating said mixture in a mold.

2. The foamed product produced by the process according to claim 1.

3. The process according to claim 1, wherein said foaming agent is a member selected from the group consisting of azobis carbonamide and N, N'-dinitrosopentamethylene tetramine.

4. A process of producing a foamed product consisting essentially of irradiating polypropylene having a specific gravity of about 0.91 and a melt index of about 3.6 with an ionizing radiation of from 0.1 to 5.0 megarad, then graft-copolymerizing the resulting irradiated polypropylene with from 0.5 to 6 percent by weight divinyl benzene and from 0.5 to 4 percent by weight of an acrylic acid ester, forming a mixture of the modified graft-copolymerized polypropylene with a foaming agent having a decomposition point higher than the melting point of said modified graft-copolymerized polypropylene and then heating said mixture in a mold.

5. The foamed product produced by the process according to claim 4.

6. The process according to claim 4, wherein said foaming agent is a member selected from the group consisting of azobis carbonamide and N, N'-dinitrosopenatamethylene tetramine.

7. A process of producing a foamed product consisting essentially of irradiating polypropylene having a specific gravity of about 0.91 and a melt index of about 3.6 with an ionizing radiation of from 0.1 to 5.0 megarad at a temperature of from $-20°$ to $-40°C$, then graft-copolymerizing the resulting irradiated polypropylene with from 1 to 3 percent by weight divinyl benzene and from 0.5 to 4 percent by weight of an acrylic acid ester at a temperature of from $30°$ to $40°C$ in a solution of said divinyl benzene and said acrylic acid ester, forming a mixture of the resulting modified graft-copolymerized polypropylene with a foaming agent selected from the group consisting of azobis carbonamide and N, N'-dinitrosopentamethylene tetramine and then heating said mixture in a mold.

8. The foamed product produced by the process according to claim 7.

* * * * *